US005719236A

United States Patent [19]

Brown et al.

[11] Patent Number: 5,719,236
[45] Date of Patent: Feb. 17, 1998

[54] COMPATIBLE COMPOSITIONS OF POLY (PHENYLENE ETHER) RESINS AND SEMI-CRYSTALLINE RESINS

[75] Inventors: Sterling Bruce Brown, Schenectady, N.Y.; Chorng-Fure Robin Hwang, Cary, N.C.; Farid Fouad Khouri, Clifton Park, N.Y.; Steven Thomas Rice, Scotia, N.Y.; James Joseph Scobbo, Jr., Slingerlands, N.Y.; John Bennie Yates, Glenmont, N.Y.

[73] Assignee: General Electric Company, Pittsfield, Mass.

[21] Appl. No.: 685,771

[22] Filed: Jul. 24, 1996

Related U.S. Application Data

[63] Continuation of Ser. No. 474,824, Jun. 7, 1995, abandoned.

[51] Int. Cl.⁶ .......................... C08L 71/12; C08L 67/02; C08L 67/03
[52] U.S. Cl. .......................... 525/133; 525/68; 525/92 D; 525/391; 525/396; 525/397
[58] Field of Search ............................... 525/133, 391, 525/396, 68, 92 D

[56] References Cited

U.S. PATENT DOCUMENTS

| | | | |
|---|---|---|---|
| 4,315,086 | 2/1982 | Ueno et al. | 525/391 |
| 4,386,174 | 5/1983 | Cogswell et al. | 524/27 |
| 4,664,972 | 5/1987 | Connolly | 428/290 |
| 4,732,937 | 3/1988 | Sybert | 525/397 |
| 4,732,938 | 3/1988 | Grant et al. | 525/92 |
| 4,816,515 | 3/1989 | Weiss | 525/396 |
| 4,831,088 | 5/1989 | Sybert | 525/396 |
| 4,845,160 | 7/1989 | Sybert | 525/391 |
| 4,866,130 | 9/1989 | Brown et al. | 525/92 D |
| 4,873,286 | 10/1989 | Gallucci et al. | 525/92 |
| 4,888,397 | 12/1989 | van der Meer | 525/391 |
| 4,916,185 | 4/1990 | Yates, III et al. | 525/397 |
| 4,978,715 | 12/1990 | Brown et al. | 525/92 D |
| 4,994,531 | 2/1991 | Brown et al. | 525/391 |
| 5,006,610 | 4/1991 | Nakamura | 525/396 |
| 5,010,144 | 4/1991 | Phanstiel, IV et al. | 525/397 |
| 5,079,297 | 1/1992 | Brown et al. | 525/92 D |
| 5,081,184 | 1/1992 | Brown et al. | 525/397 |
| 5,086,567 | 2/1992 | Phanstiel et al. | 525/397 |
| 5,089,566 | 2/1992 | Brown et al. | 525/397 |
| 5,096,979 | 3/1992 | Brown et al. | 525/396 |
| 5,110,896 | 5/1992 | Waggoner et al. | 528/190 |
| 5,112,914 | 5/1992 | Mizuno | 525/396 |
| 5,132,361 | 7/1992 | Shea et al. | 525/66 |
| 5,132,373 | 7/1992 | Khouri et al. | 525/390 |
| 5,151,460 | 9/1992 | Yates, III et al. | 525/394 |
| 5,153,267 | 10/1992 | Brown et al. | 525/92 |
| 5,153,290 | 10/1992 | Khouri et al. | 526/266 |
| 5,162,433 | 11/1992 | Nishio | 525/391 |
| 5,210,191 | 5/1993 | Phanstiel et al. | 544/214 |
| 5,212,255 | 5/1993 | Khouri et al. | 525/391 |
| 5,214,099 | 5/1993 | Khouri et al. | 525/149 |
| 5,247,006 | 9/1993 | Khouri et al. | 524/508 |
| 5,288,786 | 2/1994 | Nishio et al. | 524/451 |

FOREIGN PATENT DOCUMENTS

| | | |
|---|---|---|
| 0 323 613 A2 | 12/1989 | European Pat. Off. . |
| 0349 747 A2 | 1/1990 | European Pat. Off. . |
| 0438128 A2 | 1/1991 | European Pat. Off. . |
| 0 550 208 A1 | 7/1993 | European Pat. Off. . |
| 097555 | 4/1990 | Japan . |
| 114058 | 4/1992 | Japan . |
| 04202461-A | 7/1992 | Japan . |
| 04202462-A | 7/1992 | Japan . |
| 06041400-A | 7/1992 | Japan . |
| 202462 | 7/1992 | Japan . |
| 335046 | 11/1992 | Japan . |
| 05086266-A | 4/1993 | Japan . |
| 05117505-A | 5/1993 | Japan . |
| 88 00605 | 1/1988 | WIPO ................... 525/397 |

Primary Examiner—David Buttner

[57] ABSTRACT

Compatibilized blends of poly(phenylene ether) resins and polyester resins are provided from nucleophile containing poly(phenylene ether) resins and polyester resins and compatibilizer compounds to afford articles having good impact, ductility and tensile properties. The compositions may further comprise impact modifiers, metal salts, reinforcing agents, flame retardants and flow promoters. Articles made from the compositions are useful for automotive components.

11 Claims, No Drawings

COMPATIBLE COMPOSITIONS OF POLY(PHENYLENE ETHER) RESINS AND SEMI-CRYSTALLINE RESINS

This is a continuation of application Ser. No. 08/474,824 filed on Jun. 7, 1995 now abandoned.

BACKGROUND OF THE INVENTION

1. Field of the Invention

This invention relates to compatibilized blends of poly(phenylene ether) resins and thermoplastic polyesters that exhibit enhanced properties, such as improved impact and delamination resistance.

2. Brief Description of the Related Art

Poly(phenylene ether) resins (referred to hereafter as "PPE") are commercially attractive materials because of their unique combination of properties, including, for example, high temperature resistance, dimensional and hydrolytic stability and electrical properties. Furthermore, the combination of PPE with polyesters into compatibilized PPE-polyester blends has been sought after for additional overall properties such as, for example, chemical resistance, high strength and high flow. Examples of such compatibilized blends can be found in U.S. Pat. Nos. 4,845,160, 5,089,566, 5,153,267, 5,247,006, 5,010,144 and 5,089,567, which are incorporated herein by reference. The properties of these blends can be further enhanced by the addition of various additives such as impact modifiers, heat stabilizers, antioxidants and fillers. The physical properties of compatibilized blends comprising PPE and polyesters make them attractive for a variety of end-use articles in the automotive market, especially for lighting and under hood components.

All of the aforementioned examples of compatibilized PPE-polyester blends require suitable PPE that contain electrophilic moieties capable of reacting with the carboxylic acid endgroups of the polyesters to afford PPE-polyester copolymers. Unfortunately, none of the suitable PPE are readily manufactured on a commercial scale. Specifically, the triazine capped PPE are made from functionalized triazines, which are not commercially available. Commercially available epoxy materials (i.e., glycidyl acrylate and glycidyl methacrylate) are too toxic to be readily handled commercially.

It is therefore apparent that a need continues to exist for alternative compatibilization strategies for PPE-polyester blends which overcome some of the aforementioned difficulties.

SUMMARY OF THE INVENTION

The needs discussed above have been satisfied by the surprising discovery of an improved thermoplastic composition which comprises:

(A) a nucleophile containing poly(phenylene ether) resin;

(B) a thermoplastic polyester resin; and (C) a compatibilizer compound for components (A) and (B).

In preferred embodiments, the present invention provides compatibilized PPE-polyester compositions that are free of visual signs of lamination, have improved phase morphology stabilization and possess good impact and tensile properties. The description which follows provides further details regarding this invention.

DETAILED DESCRIPTION OF THE INVENTION

PPE, per se, are known polymers comprising a plurality of structural units of the formula (I):

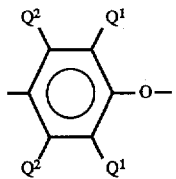

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Preferably, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4-phenylene ether units. Suitable copolymers include random copolymers containing, for example, such units in combination with 2,3,6-trimethyl-1,4-phenylene ether units. Also included are PPE containing moieties prepared by grafting vinyl monomers or polymers such as polystyrenes, as well as coupled PPE in which coupling agents such as low molecular weight polycarbonates, quinones, heterocycles and formals undergo reaction in known manner with the hydroxy groups of two PPE chains to produce a higher molecular weight polymer.

The PPE generally have a number average molecular weight within the range of about 3,000–40,000 and a weight average molecular weight within the range of about 20,000–80,000, as determined by gel permeation chromatography. Its intrinsic viscosity is most often in the range of about 0.15–0.6 dL/g., as measured in chloroform at 25° C.

The PPE are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful PPE for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the PPE contemplated for use in the present invention include all those presently known, irrespective of variations in structural units or ancillary chemical features.

It is preferable for at least some of the PPE to be a "nucleophile containing PPE." Nucleophile containing PPE refers to PPE which contain species which are electron rich and are capable of seeking electron deficient reactive sites with which to react. These nucleophile containing PPE are sometimes referred to as "functionalized PPE." In the final blend, the nucleophile containing or functionalized PPE are commonly referred to as "compatibilized PPE" because of the resultant improved compatibility between the PPE and the other components. Accordingly, appropriate nucleophile containing PPE are those which affect the compatibility of the PPE with the various components of the blend (e.g., the PPE and the polyester resin). Compatibility is meant to include the stabilization of gross phase separation between the components of the blend. Indicators of improved compatibilization include, for example, increased tensile properties, reduced lamination tendency, increased ductility and improved phase morphology stabilization. It is through the effect of improving the compatibility of the blend components which determines, in part, the desirable physical properties of the blend.

One way to prepare appropriate nucleophile containing PPE is to functionalize the PPE by reacting the PPE with at least one compound having both (i) a carbon-carbon double bond or a carbon-carbon triple bond and (ii) at least one species of the group consisting of carboxylic acids, acid anhydrides, acid amides, imides, amines, hydroxyls and carboxylic acid ammonium salts. These compounds are sometimes referred to as functionalizers. Illustrative compounds used to accomplish the functionalization of the PPE include maleic anhydride, fumaric acid, maleimides such as N-phenylmaleimide and 1,4-phenylene-bis-methylene-α,α'-bismaleimide, maleic hydrazide, methylnadic anhydride, fatty oils (e.g., soybean oil, tung oil, linseed oil, sesame oil), unsaturated carboxylic acids such as acrylic, crotonic, methacrylic acid and oleic acid, unsaturated alcohols such as allyl alcohol and crotyl alcohol and unsaturated amines such as allylamine and trialkyl amine salts of unsaturated acids such as triethylammonium fumarate and tri-n-butylammonium fumarate. Examples of such typical reagents for preparing useful functionalized PPE are described in U.S. Pat. Nos. 4,315,086, 4,755,566, and 4,888,397, which are incorporated herein by reference.

Non-polymeric aliphatic polycarboxylic acids are also useful for preparing an appropriate nucleophile containing PPE. Included in the group of species, also known as compatibilizers or functionalizers, are, for example, the aliphatic polycarboxylic acids, and acid esters represented by the formula (II):

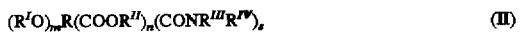

$(R^{I}O)_mR(COOR^{II})_n(CONR^{III}R^{IV})_s$ (II)

wherein R is a linear or branched chain, saturated aliphatic hydrocarbon of from 2 to 20, preferably 2 to 10, carbon atoms; $R^I$ is selected from the group consisting of hydrogen or an alkyl, aryl, acyl, or carbonyl dioxy group of 1 to 10, preferably 1 to 6, most preferably 1 to 4, carbon atoms, with hydrogen being especially preferred; each $R^{II}$ is independently selected from the group consisting of hydrogen or an alkyl or aryl group of from 1 to 20 carbon atoms preferably from 1 to 10 carbon atoms; each $R^{III}$ and $R^{IV}$ is independently selected from the group consisting essentially of hydrogen or an alkyl or aryl group of from 1 to 10, preferably from 1 to 6, most preferably 1 to 4, carbon atoms; m is equal to 1 and (n+s) is greater than or equal to 2, preferably equal to 2 or 3, and n and s are each greater than or equal to zero; and wherein ($OR^I$) is alpha or beta to a carbonyl group and at least two carbonyl groups are separated by 2 to 6 carbon atoms. Obviously, $R^I$, $R^{II}$, $R^{III}$ and $R^{IV}$ cannot be aryl when the respective substituent has less than 6 carbon atoms.

Illustrative of suitable polycarboxylic acids are citric acid, malic acid, and agaricic acid; including the various commercial forms thereof, such as, for example, the anhydrous and hydrated acids. Illustrative acid esters useful herein include, for example, acetyl citrate and mono- and/or di-stearyl citrates and the like. Suitable acid amides useful herein include, for example, N,N'-diethyl citric acid amide; N,N'-dipropyl citric acid amide; N-phenyl citric acid amide; N-dodecyl citric acid amide; N,N'-didodecyl citric acid amide and N-dodecyl malic acid amide. Derivatives of the foregoing polycarboxylic acids are also suitable for use in the practice of the present invention. Examples of suitable functionalizing compounds can be found in U.S. Pat. Nos. 4,315,086, 4,755,566, 4,873,286 and 5,000,897, all of which are incorporated herein by reference.

The amount of the above mentioned nucleophile containing functionalizing agents that is required to appropriately functionalize the PPE is that which is sufficient to improve the compatibility between the various components in the composition. As previously discussed, indications of improved compatibility include resistance to lamination, improved physical properties such as increased tensile and impact properties and a stabilized morphology between the blend component phases under static or low shear conditions.

It is thought that reactions can occur between some of the components of the composition, for example, between the nucleophile containing PPE and the compatibilizer compound, the compatibilizer compound and the polyester resin, or between the nucleophile containing PPE, compatibilizer compound and the polyester resin. These reactions are thought to lead to various copolymers between the components of the blend. An effective amount of the above mentioned functionalizers, based on the amount of the PPE, is generally up to about 8% by weight, and is preferably from about 0.05% to about 4% by weight. In the most preferred embodiments, the amount of the functionalizing agent is in the range of about 0.1% to about 2.0% by weight based on the amount of the PPE. The actual amount utilized will also depend on the molecular weight of the functionalizing agent, the number and type of reactive species per molecule of functionalizing agent and the degree of compatibility that is desired in the final PPE-polyester resin blend.

Another useful method for preparing an appropriate nucleophile containing PPE involves reacting PPE with a compound containing an acyl functional group and a nucleophilic species or a species capable of being transformed into nucleophilic species. Non-limiting examples include chloroformyl succinic anhydride, chloroethanoyl succinic anhydride, trimellitic anhydride acid chloride, 1-acetoxy-acetyl-3,4-dibenzoic acid anhydride, and terephthalic acid acid chloride. Additional examples and methods to prepare such compatibilizing PPE can be found in U.S. Pat. Nos. 4,600,741 and 4,642,358, each of which is incorporated herein by reference.

Polyesters suitable for use as Component B of the present compositions include those comprising structural units of the formula (III):

$$-O-R^1-O-\overset{O}{\underset{\|}{C}}-A^1-\overset{O}{\underset{\|}{C}}-$$ (III)

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof. Examples of suitable polyesters containing the structure of formula (III) are poly(alkylene dicarboxylates), elastomeric polyesters, liquid crystalline polyesters, polyarylates, and polyester copolymers such as copolyestercarbonates and polyesteramides. Also included are polyesters that have been treated with relatively low levels of diepoxy or multi-epoxy compounds. It is also possible to use a branched polyester in which a branching agent, for example, a glycol having three or more hydroxyl groups or a trifunctional or multifunctional carboxylic acid has been incorporated. Treatment of the polyester with a trifunctional or multifunctional epoxy compound, for example, triglycidyl isocyanurate can also be used to make a branched polyester. Furthermore, it is sometimes desirable to have various concentrations of acid and hydroxyl endgroups on the polyester, depending on the ultimate end-use of the composition.

It is preferred for at least some of the polyester to contain nucleophilic groups such as, for example, carboxylic acid groups. In some instances, it is desirable to reduce the number of acid endgroups, typically to less than about 30 micro equivalents per gram, with the use of acid reactive species. In other instances, it is desirable that the polyester has a relatively high carboxylic end group concentration, e.g., about 5–250 micro equivalents per gram or, more preferable, about 20–70 micro equivalents per gram.

The $R^1$ radical may be, for example, a $C_{2-10}$ alkylene radical, a $C_{6-10}$ alicyclic radical, a $C_{6-20}$ aromatic radical or a polyoxyalkylene radical in which the alkylene groups contain about 2–6 and most often 2 or 4 carbon atoms. The $A^1$ radical in the above formula (III) is most often p- or m-phenylene or a mixture thereof. This class of polyesters includes the poly(alkylene terephthalates), the poly(alkylene naphthalates) and the polyarylates. Polyesters are known in the art as illustrated by the following U.S. Patents, which are incorporated herein by reference.

| 2,465,319 | 2,720,502 | 2,727,881 | 2,822,348 |
| --- | --- | --- | --- |
| 3,047,539 | 3,671,487 | 3,953,394 | 4,128,526 |

The poly(alkylene terephthalates), for example, poly (ethylene terephthalate) (commonly abbreviated as "PET"), poly(cyclohexyldimethanol terephthalate) (commonly abbreviated as "PCT"), and poly(butylene terephthalate) (commonly abbreviated as "PBT") are examples of suitable polyesters for the present invention. Additional suitable polyesters include poly(alkylene naphthalate)s such as, for example, poly(alkylene-2,6-naphthalate)s including poly (butylene-2,6-naphthalate) (commonly abbreviated "PBN") and poly(ethylene-2,6-naphthalate) (commonly abbreviated "PEN"). Liquid crystalline polyesters having melting points less that about 380° C. and comprising recurring units derived from aromatic diols, aliphatic or aromatic dicarboxylic acids, and aromatic hydroxy carboxylic acids are also useful. Examples of useful liquid crystalline polyesters are those described in U.S. Pat. Nos. 4,664,972 and 5,110, 896, which are incorporated herein by reference. Various mixtures of polyesters are also sometimes very suitable.

The various polyesters can be distinguished by their corresponding glass transition temperatures (e.g., Tg) and melting points (e.g., Tm). The liquid crystalline polyesters generally have Tg's and Tm's that are higher than the naphthalate-type polyesters. The naphthalate-type polyesters generally have Tg's and Tm's that are higher than the terephthalate-type polyesters. Thus, the resultant PPE alloys with the liquid crystalline or naphthalate-type polyesters are typically better suited to applications requiring higher temperature resistance than are the terephthalate-type polyesters. The PPE alloys with terephthalate-type polyesters are generally easier to process due to the polyesters' lower Tg's and Tm's. Selection of the polyester or blend of polyesters utilized is therefore determined, in part, by the desired property profile required by the ultimate end-use application for the PPE-polyester alloy.

The polyester may include structural units of the formula (IV):

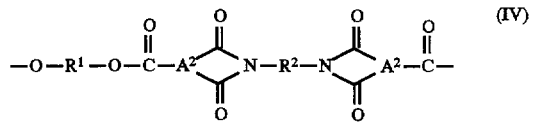

wherein $R^1$ is as previously defined. $R^2$ is a polyoxyalkylene radical and $A^2$ is a trivalent aromatic radical, usually derived from trimellitic acid and has the structure (V):

Such polymers and their mode of preparation are described for example in U.S. Pat. Nos. 4,544,734, 4,556,705, and 4,556,688, which are incorporated herein by reference.

Because of the tendency of polyesters to undergo hydrolytic degradation at the high extrusion and molding temperatures encountered by the compositions of this invention, it is preferred that the polyester be substantially free of water. The polyester may be predried before admixing with the other ingredients. More commonly, the polyester is used without predrying and the volatile materials are removed through the use of vacuum venting the extruder.

The polyesters generally have number average molecular weights in the range of about 20,000–70,000, as determined by intrinsic viscosity (I.V.) at 30° C. in a 60:40 by weight mixture of phenol and 1,1,2,2-tetrachloroethane.

Compatibilizer compounds, also known as compatibilizing agents, for the PPE and polyester resins are another element of the present invention. Suitable compatibilizer compounds include those compounds which contain electrophilic groups capable of reacting with nucleophilic groups contained on the functionalized PPE and the polyester resins. Examples of useful electrophilic groups include, for example, epoxy and ortho ester groups. Preferred compatibilizer compounds include compounds containing multiple ortho esters, epoxy resins and polyolefinic compounds that contain the aforementioned electrophilic groups. The compatibilizer compounds preferably contain at least two electrophilic groups per molecule although there can be present some mono-functional species. It is possible for the compatibilizing agent to contain more than one type of electrophilic species.

Thus, according to one embodiment of the invention, the compatibilizer compound is added in an amount effective to provide a thermoplastic resin composition which exhibits improved compatibility over the same composition without a compatibilizer compound. As previously mentioned, compatibility is meant to include the minimization of gross phase separation between the components of the blend. Indicators of improved compatibilization include, for example, increased tensile properties, reduced delamination tendency, increased ductility and improved phase morphology stabilisation. It is through the effect of improving the compatibility of the blend components which determines, in part, the desirable physical properties of the blend.

The compatibilizer compound is typically a liquid or solid epoxy or ortho ester compound. Compatibilizer compounds having a molecular weight from about 100 to about 10,000 are preferred. As previously discussed, the preferred compatibilizer compounds comprise at least two reactive groups per molecule, although the average reactive number may be less than 2 per molecule (e.g., the compatibilizer compound may be a mixture of reactive compounds having a variety of reactive groups per molecule). Two or more orthoester moieties or epoxy groups can generally be linked by most any group that is stable to the processing conditions for the PPE composition and is not reactive with the ortho ester and epoxy moieties. Illustrative examples of useful linking groups include: alkyl, cycloalkyl, aryl, esters, amides, heteroaryls such as, for example, triazines, pyridines, pyrimidines, furans, etc., phosphoryl, sulfonyl, dialkylsilicon, and the like. Additional examples of ortho ester or epoxy compounds useful in this invention include: ortho ester and epoxy derivatives of bisphenols such as bisphenol A, resorcinol, hydroquinone, pyrocatechol, bisphenol F, tetrabromobisphenol A, phenol novolaks, o-cresol novolaks, polypropylene glycol, hydrogenated bisphenol A, saligenin, 1,3,5-trihydroxybenzene, 4,4'-dihydroxybiphenyl, 1,5-dihydroxynaphthalene, cashew phenol, dihydroxydiphenylsulfone and 2,2,5,5,-tetrakis(4-hydroxyphenyl)hexane; glycidyl ethers of halogenated bisphenols, glycidyl ethers such as a diglycidyl ether of butanediol; glycidyl esters such as glycidyl phthalate, glycidylamines such as N,N-diglycidylaniline; linear epoxy resins such as epoxidized polyolefins and epoxidized soybean oils; cyclic epoxy resins such as vinyl cyclohexane dioxide and dicyclopentadiene dioxide; glycidyl esters of hexahydrophthalic anhydride, dimer acids; amine epoxy resins derived from diaminodiphenylmethane, isocyanuric acid, hydantoin; mixed epoxy resins derived from p-aminophenol, p-oxybenzoic acid; salicylic epoxy resins and novolak phenol-type resins; orthoester and epoxy derivatives of halogenated bisphenols; ortho esters such as a bis-orthoester ether of butanediol; compounds such as bis-orthoester phthalates and mixed species such as the epoxy orthoester phthalate made by the reaction of a glycerol ortho ester, glydicol, and phthaloyl chloride. The epoxy and orthoester compounds can also contain other groups that are reactive with the PPE, the polyester, or both. The compatibilizer compounds may be used singly or as mixtures of two or more.

Compatibilizers may also include polymers containing orthoester-functional groups, epoxy-functional groups, and mixtures of epoxy and orthoester-functional groups. Examples of such orthoester substituted polymers include, for example, orthoester-functional polystyrene and polyolefins (i.e., polyethylene and polypropylene), orthoester-functional elastomers such as EPR, EPDM, and styrene based block copolymers, orthoester-functional polysiloxanes, orthoester-functional polycarbonates, polyimides and polyetherimides, orthoester-functional polyalkylene glycols and similar orthoester substituted polymers. Similar polymers containing epoxy moieties are also useful.

The term "orthoester" refers to a compound in which one carbon atom is attached to another by a direct carbon-carbon bond and to three further carbon atoms through oxygen. The orthoester may be characterized by the structure (VI):

—C(OR$^6$)$_3$ (VI)

wherein, R$^6$ is a hydrocarbon radical, usually a C$_{1-4}$ primary or secondary alkyl radical. The R$^6$ radicals may the same or different and may even be connected together to form various cyclic structures. The orthoesters can be considered to be esters of the hypothetical orthoacids R—C(OH)$_3$, wherein R is an organic radical. The existence of such orthoacids is for the most part unknown, since they immediately dehydrate to conventional carboxylic acids. However, esters of such acids are known and the compositions of this invention include certain polymer substituted esters of this type.

Polyolefins and polyolefin copolymers containing orthoester groups are useful as compatibilizing agents. The orthoester functional polyolefins or polyolefin copolymers, preferably contain orthoester moieties represented by the formula (VII):

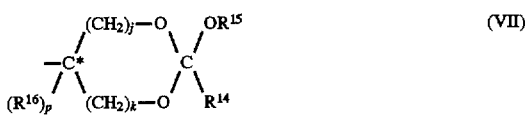

(VII)

where R$^{15}$ is a C$_{1-4}$ primary or secondary alkyl radical or is an alkylene radical forming a second 5- or 6-member ring with C*; R$^{14}$ is a C$_{1-4}$ primary or secondary alkyl or C$_{6-10}$ aromatic radical, or R$^{14}$ and R$^{15}$ together with the atoms connecting them form a 5-, 6- or 7-member ring; R$^{16}$ is hydrogen or C$_{1-4}$ primary secondary alkyl; K is 0 or 1; J is from 1 to 2-K; and p is 0 when R$^{15}$ and C* form a ring and is otherwise 1.

The R$^{15}$ radical may be a C$_{1-4}$ primary or secondary alkyl radical such as methyl, ethyl, n-propyl, isopropyl, n-butyl, isobutyl or secondary butyl. Primary radicals and especially the methyl radical are generally preferred. It is also possible for R$^{15}$ to form a second 5- or 6-member ring with other portions of the molecule. For this purpose, one of the carbon atoms in the orthoester ring is designated C* to indicate its role as part of said second ring.

The R$^{14}$ value may be a C$_{1-4}$ primary or secondary alkyl radical as defined above for R$^{15}$ or a C$_{6-10}$ aromatic (preferably aromatic hydrocarbon) radical. Finally, it is possible for R$^{14}$ and R$^{15}$ together to form a 5-, 6- or 7-member ring with the atoms connecting them. The R$^{16}$ radical may be hydrogen or an alkyl radical similar to R$^{14}$ and R$^{15}$. It is preferably hydrogen.

The values of J and K depend on whether the cyclic orthoester moiety is a 5-member or 6-member ring. In general, 5-member rings are preferred; that is, K is 0 and J is 1. However, the invention also includes compositions in which a 6-member ring is present, which requires either that J and K both be 1 or that K be 0 and J be 2.

The value of the subscript p also depends on the cyclic structure of the orthoester moiety. If C* is part of a ring structure with R$^{15}$, all four valences thereof are satisfied and p will be 0. If this is not the case, p will be 1.

The following is an illustrative orthoester moiety (VIII) that may be present in an orthoester functionalized compatibilizer compound:

(VIII)

and which may also be referred to as a 4-(2-methoxy-2-methyl-3-dioxolanyl) radical and is usually preferred. Intermediates for preparation of such compounds include 4-hydroxymethyl-2-methoxy-2-methyl-1,3-dioxolane, which is obtainable by the reaction of glycerol and methyl orthoacetate. An improved method for the preparation of this and related compounds in substantially pure form and the products thus obtained are disclosed in U.S. Pat. No. 5,231,197, which is incorporated herein by reference. The following illustrative orthoester moiety (IX) may be present in the orthoester functional compatibilizer compound:

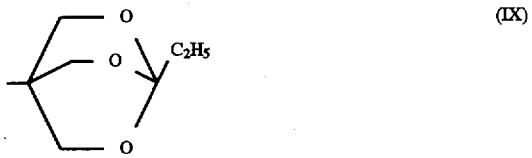

The above moiety may be referred to as a 4-(1-ethyl-2,6,7-trioxabicyclo[2.2.2]octyl) radical; the methylol derivative thereof can be prepared by the reaction of ethyl orthoacetate with a substantially equimolar amount of pentaerythritol. Methods to make the orthoester modified polyolefins can be found in U.S. Pat. Nos. 5,153,290 and 5,132,361, both of which are incorporated herein by reference.

An example of a bis(orthoester) useful as a compatibilizing agent is represented by the formula (X):

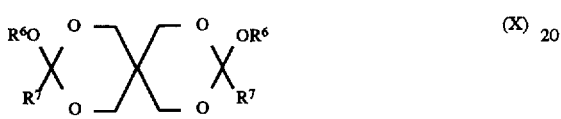

wherein $R^6$ is as described for FIG. (VI) and $R^7$ is preferably a $C_{1-4}$ primary or secondary alkyl, $C_{6-10}$ aromatic radical, or $R^6$ and $R^7$ are connected to form a 5- or 6-member ring.

Additional examples of useful orthoester compounds include compounds of the following formulas (XI):

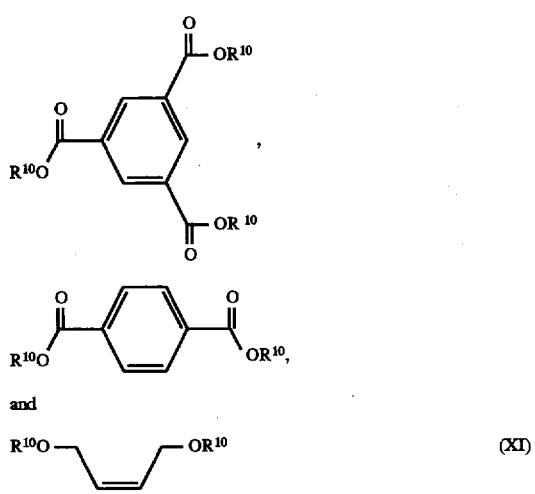

wherein $R^{10}$ is a moiety containing an orthoester group, preferably $R^{10}$ is an orthoester represented by the structure in FIGS. (VII) and (IX). Several different approaches are useful to prepare compatibilizing compounds such as those in FIG. (XI). These methods include: (i) Direct acylation of a hydroxyorthoester with an acid dichloride or trichloride; (ii) Etherification of an electrophilic bifunctional monomer with a hydroxyorthoester by phase transfer catalyzed nucleophilic displacement reaction; and (iii) Direct transorthoesterification of a tetraol with trimethylorthoacetate.

The starting hydroxyorthoesters, 4-hydroxymethyl-2-methoxy-2-methyl-1,3-dioxolane and 4-hydroxymethyl-1-ethyl-2,6,7-trioxabicyclo[2.2.2]octane were prepared as described in U.S. Pat. No. 5,132,373 and in Polymer Journal 13, 715 (1981), both are incorporated herein by reference. Two moles of at least one of these hydroxyorthoesters or structurally related monomers can be linked by an acid dichloride or trichloride. The etherification reaction is carried out by starting with the hydroxyorthoester and a bifunctional electrophile or inversely by reacting an electrophilic orthoester and a bifunctional nucleophilic linking unit such as a diol dianion, a bisphenol dianion or a dicarboxylate salt.

The transorthoesterification route is carried out by starting with pentaerythritol, although it is also possible to use any tetraol that has a 1,2- or 1,3 predisposition of two hydroxyl groups, so as to allow formation of cyclic dioxolane or dioxane ring structures. Many sugar compounds are potentially suitable for this approach.

As previously mentioned, epoxy compounds are also useful compatibilizing compounds. The novolak phenol-type epoxy resins are sometimes preferred. Useful novolak phenol resins include those obtained by the condensation reaction of phenols and formaldehyde. The preferred novolak phenol-type epoxy resins include those usually obtained by reacting the novolak-type phenolic resins with epichlorohydrin to give structures schematically illustrated by formula (XII):

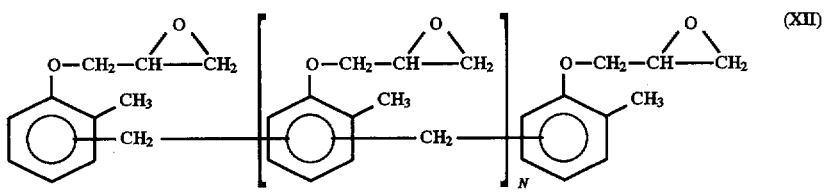

wherein N is 0 or more and typically from 0 to about 5.

The epoxy cresol novolaks are available from Ciba-Geigy as ECN 1235 (average value for N=0.7), ECN 1273 (average value for N=2.8) and ECN 1299 or ECN9495 (average value for N=3.4).

There is no particular restriction on the starting phenols, but suitable phenols include phenol, o-cresol, m-cresol, p-cresol, bisphenol A, resorcinol, p-tertiary butyl phenol, bisphenol F, bisphenol S, and mixtures of these.

Polyolefin and polyolefin copolymers comprising epoxy groups are also useful as compatibilizing agents. Examples of such olefinic compounds include, for example, copolymers of an α-olefin with a glycidyl ester of an α,β-unsaturated carboxylic acid. α-Olefin as used herein means ethylene, propylene, butene-1, etc. Among them, ethylene is preferred. The glycidyl esters of the α,β-unsaturated acids are compounds of the general formula (XIII):

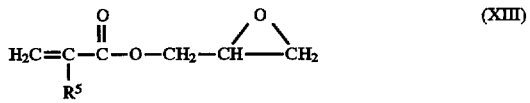

wherein $R^5$ represents a hydrogen atom or a lower alkyl group. Examples of the glycidyl esters of α,β-unsaturated acids include glycidyl acrylate, glycidyl methacrylate and glycidyl ethacrylate. The epoxy-functional polyolefin is preferably an olefinic copolymer containing about 60% to about 99.5% by weight of an α-olefin and about 0.5% to about 40% by weight, preferably about 3% to about 30% by weight, of a glycidyl ester of an α,β-unsaturated carboxylic acid. When the amount of glycidyl ester is less than about 0.5% by weight, little or no discernible effects are observed. To the contrary, when it exceeds about 40% by weight, gelation occurs during melt-blending with the compatibilizing PPE to damage the extrusion stability, moldability and mechanical properties of the product. It is also possible to blend the epoxy-functional polyolefin with various non-functionalized polyolefins such as, for example, linear low density polyethylene (commonly abbreviated "LLDPE"), polypropylene and ethylene-propylene copolymers provided that the overall epoxy content remains within the previously described range.

Suitable copolymers or terpolymers for the epoxy-functional polyolefin include, for example, ethylene-glycidyl acrylate copolymers, ethylene-glycidyl methacrylate copolymers, ethylene-glycidyl methacrylate-vinyl acetate terpolymers, ethylene-glycidyl methacrylate-methyl acrylate terpolymers, ethylene-ethyl acrylate-glycidyl methacrylate terpolymers. The preferred epoxy-functional polyolefins are available from Sumitomo Chemical Co., Ltd. under the trademarks IGETABOND and BONDFAST and from Elf Atochem under the trademark LOTADER.

The compatibilizer compound is used in an amount effective to improve the physical properties, for example, increase the tensile strength and elongation, of the composition. The actual amount of compatibilizer compound used with vary depending on a number of factors such as, for example, the reactivity between the nucleophile containing PPE and the compatibilizer, the degree of compatibility desired, the number of reactive groups present, and similar other variables. The amount of the compatibilizer compound is typically in the range from about 0.1 weight percent to about 20 weight percent based on the weight of the entire composition. More preferably, the amount of the compatibilizer compound is typically in the range from about 0.5 weight percent to about 15 weight percent based on the weight of the entire composition. Determination of an exact amount of of the compatibilizer compound can be determined by those skilled in the art without undue additional experimentation.

The compositions of the present invention may also contain at least one impact modifier that is not a compatibilizer compound for PPE and polyester resins. The impact modifiers include block (typically diblock, triblock or radial teleblock) copolymers of alkenyl aromatic compounds and dienes. Most often at least one block is derived from styrene and at least one block from at least one of butadiene and isoprene. Especially preferred are the triblock and diblock copolymers comprising polystyrene blocks and diene derived blocks wherein the aliphatic unsaturation has been preferentially removed with hydrogenation. Mixtures of various copolymers are also sometimes useful. The weight average molecular weights of the impact modifiers are typically in the range of about 50,000 to 300,000. Block copolymers of this type are commercially available from Shell Chemical Company under the trademark KRATON, and include, for example, grades D1101, D1102, G1650, G1651, G1652, G1701 and G1702.

Other suitable impact modifiers are the core-shell type graft copolymers. In general, these have a predominantly conjugated diene rubbery core or a predominantly cross-linked acrylate rubbery core and one or more shells polymerized thereon and derived from monoalkylarene and/or acrylic monomers alone or, preferably, in combination with other vinyl monomers. The core-shell copolymers are widely available commercially in pellet and powder forms, for example, from Rohm and Haas Company under the trade names EXL-3330, EXL-3691, EXL-2600, EXL-2607, EXL-2647, EXL-3386, and EXL-3607, and are described in U.S. Pat. Nos. 3,808,180, 4,034,013, 4,096,202, 4,180,494 and 4,292,233.

Various mixtures of the aforementioned impact modifiers are also sometimes useful. The amount of the impact modifier generally present, when one is used, is an amount effective to improve the physical properties, for example, the ductility of the composition when compared to the same composition without an impact modifier. Improved ductility can be indicated by increased impact strength or increased tensile elongation to break. Generally, the impact modifier is utilized in the range of about 1% to about 20% by weight based on the total weight of the composition. The preferred range is about 3% to about 15% by weight; based on the total weight of the composition and the most preferred range is between about 5% to about 12% by weight; based on the total weight of the composition. The exact amount and types or combinations of impact modifiers utilized will depend in part on the requirements needed in the final blend composition.

The polymer mixture according to the invention may also comprise a non-elastomeric metal salt, having a melting temperature lower than the compounding temperature of the polymer mixture. It is of importance for the melting temperature of the metal salt to be lower than the compounding temperature of the polymer mixture; when the melting temperature is equal to or higher than the compounding temperature, the metal salt is less effective for improving the mechanical properties. The compounding temperature is the temperature at which the constituents of the polymer mixture according to the invention are mixed to a more or less homogeneous mass in the melted condition or a similar condition. The compounding temperature generally is above about 250° C., usually between approximately 280° C. and 330° C.

Suitable metal salts are inorganic or organic salts, more preferably metal salts of organic acids. Suitable organic acids are saturated and unsaturated aliphatic carboxylic acids, aromatic carboxylic acids, aliphatic and aromatic sulphonic or phosphonic acids and salts of alkyl hydrogen sulphates. The organic part of the salts preferably has a molecular weight below about 500, more preferably below about 300. Specific organic acids include, but are not restricted to: benzoic, palmitic, lauric, acetic, stearic, gluconic, as well as dodecyl benzene sulphonic acids.

Suitable metal salts may be taken from a broad range of metals provided that the salt has a melting temperature lower than the polymer mixture compounding temperature. Metals such as calcium, aluminum and zinc are preferred but this does not preclude metals such as sodium, lithium, potassium, barium, beryllium, magnesium, copper, cobalt and iron. In particular metal salts of stearic acid are preferred as they have appropriate melting points and are widely available commercially in pure forms.

The amount of the non-elastomeric metal salt, when one is used, is an amount effective to improve the physical properties, for example, the ductility of the composition. As previously mentioned, improved ductility can be indicated by increased impact strength or increased tensile elongation to break. Generally, the metal salt is present in the range of about 0.01% to about 5% by weight based on the total weight of the composition. The preferred range is about 0.1% to about 3% by weight and the most preferred range is about 0.2% to about 2% by weight; based on the total weight of the composition.

The compositions of the present invention may also contain at least one nonelastomeric polymer of an alkenylaromatic compound. Suitable polymers of this type may be prepared by methods known in the art including bulk, suspension and emulsion polymerization. They generally contain at least about 25% by weight of structural units derived from an alkenylaromatic monomer of the formula (XIV):

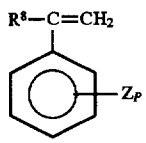
(XIV)

wherein $R^8$ is hydrogen, lower alkyl or halogen; Z is vinyl, halogen or lower alkyl; and p is from 0 to 5. These resins include homopolymers of styrene, chlorostyrene and vinyltoluene, random copolymers of styrene with one or more monomers illustrated by acrylonitrile, butadiene, α-methylstyrene, ethylvinylbenzene, divinylbenzene and maleic anhydride, and rubber-modified polystyrenes comprising blends and grafts, wherein the rubber is a polybutadiene or a rubbery copolymer of about 98–68% styrene and about 2–32% diene monomer. These rubber modified polystyrenes include high impact polystyrene (commonly referred to as HIPS). Non-elastomeric block copolymer compositions of styrene and butadiene can also be used that have linear block, radial block or tapered block copolymer architectures. They are commercially available from such companies as Fina Oil as under the trademark FINACLEAR and Phillips under the trademark K-RESINS.

The amount of the polymer of a nonelastomeric alkenylaromatic compound, when one is used, is an amount effective to improve the flow of the composition. Improved flow can be indicated by reduced viscosity or reduced injection pressures needed to fill a part during an injection molding process. Generally, the nonelastomeric alkenylaromatic compound is utilized in the range of about 1% to about 20% by weight based on the total weight of the composition. The preferred range is about 3% to about 15% by weight and the most preferred range is about 5% to about 12% by weight; based on the total weight of the composition.

Compositions of the present invention can also include effective amounts of at least one additive selected from the group consisting of anti-oxidants, flame retardants, drip retardants, crystallization nucleators, dyes, pigments, colorants, reinforcing agents, fillers, stabilizers, antistatic agents, plasticizers and lubricants. These additives are known in the art, as are their effective levels and methods of incorporation. Effective amounts of the additives vary widely, but they are usually present in an amount up to about 50% or more by weight, based on the weight of the entire composition.

The ratio of the nucleophile containing PPE or mixture of nucleophile containing PPE with unfunctionalized PPE to polyester resin can vary from about 99:1 to 1:99, depending on the various property requirements that the composition must meet. The resulting compositions may exhibit either a matrix phase of PPE having polyester particles dispersed therein or a matrix of polyester having PPE particles dispersed therein. For compositions having a continuous phase of polyester, the preferred ranges are generally from about 1–60% by weight of the compatibilizing PPE or mixture of compatibilizing PPE with normal PPE, about 99–40% by weight of the polyester resin and about 0.1–20% by weight of the electrophile containing compatibilizer compound. The most preferred range is generally from about 10–40% by weight of the nucleophile containing PPE or mixture of nucleophile containing PPE with PPE not functionalized with one of the nucleophilic species and about 90–60% by weight of the polyester resin. The preferred range of the electrophile containing compatibilizer compound generally depends, among other factors, on the number of electrophilic species per molecule of compatibilizer compound, the reactivity between the nucleophile groups and the electrophile groups in the polymer blend and the degree of compatibilization that is desired between the various components. Moreover, when the electrophile groups are present on a material capable of serving the role of an impact modifier, consideration should be given to the degree of toughness desired. For compositions having a continuous phase of the PPE, the ratios of PPE and polyester given above can be inverted. One of ordinary skill in the art will be able to optimize the amount and type of compatibilizer compound required based on the intended physical properties desired without undue additional experimentation.

It was also surprisingly found that the functionalized PPE could be diluted with non-functionalized PPE to adjust the viscosity of the blend composition with the polyester resins. This discovery allows for a master batch of functionalized PPE to be prepared and admixed with non-functionalized PPE and compatibilizer compound and polyester resin, in addition to other ingredients, to make a family of similar compositions having a range of viscosities made from common starting materials to meet a variety of end-use requirements for the final compositions.

Additionally, it was discovered that by combining a nucleophile containing PPE, compatibilizer compound and polyester resin, it was possible to obtain a composition that had a marked improvement in chemical resistance to common automotive solvents over comparative compositions wherein the PPE was not appropriately functionalized or was insufficiently functionalized to improve the compatibility between the components. Thus, according to another embodiment of the invention, a functionalized PPE is used in combination with a compatibilizer compound and polyester resin to obtain superior chemical resistance.

Compatibilized PPE-polyester blends of the present invention can be prepared by a variety of methods involving intimate admixing of the materials with any additional additives desired in the formulation. Suitable procedures include solution blending and melt blending. Because of the availability of melt blending equipment in commercial polymer processing facilities, melt processing procedures are generally preferred. Examples of equipment used in such melt compounding methods include: co-rotating and counter-rotating extruders, single screw extruders, disc-pack processors and various other types of extrusion equipment. In some instances, the compounded material exits the extruder through small exit holes in a die and the resulting strands of molten resin are cooled by passing the strands through a water bath. The cooled strands can be chopped into small pellets for packaging and further handling.

All of the ingredients may be added initially to the processing system, or else certain additives may be precompounded with each other or with one of the primary polymer components, PPE, compatibilizer compound and polyester resin. It appears that certain properties, such as impact strength and elongation, are sometimes enhanced by initially precompounding the PPE with at least one of the typical agents used to prepare a nucleophile containing PPE prior to blending with the compatibilizer compound and polyester resin. While separate extruders may be used in the processing, these compositions may also be prepared by using a single extruder having multiple feed ports along its length to accommodate the addition of the various components. It is also sometimes advantageous to employ at least one vent port in each section between the feed ports to allow venting (either atmospheric or vacuum) of the melt. Those of ordinary skill in the art will be able to adjust blending times and temperatures, as well as component addition location and sequence, without undue additional experimentation.

The compositions of the present invention are free of other thermoplastic resins such as, for example, polycarbonates, polyamides, polyetherimides, and polysulfones. It should also be clear that improved molded articles prepared from the compositions of the present invention represent an additional embodiment of this invention.

The following examples are provided to illustrate some embodiments of the present invention. They are not intended to limit the invention in any aspect. All percentages are by weight based on the total weight of the entire composition, unless otherwise indicated.

EXAMPLES

The following examples of illustrative of methods used to prepare various orthoester compatibilizing compounds.
Synthesis of Terephthaloyl Bisorthoesters:
Method A:

In a 2 liter 3-necked round-bottomed flask equipped with an addition funnel, a nitrogen inlet and a thermometer, a mixture of 4-hydroxymethyl-2-methoxy-2-methyl-1,3-dioxolane (70 g., 472.5 mmol) and triethylamine (132 ml., 944 mmol) were dissolved in 500 ml. of dichloromethane and kept under a positive nitrogen atmosphere. The solution was cooled in an ice bath. A solution of terephthaloyl chloride (47.96 g., 236 mmol) in 500 ml. of dichloromethane was then added over a period of 2 hours keeping the reaction temperature below 15° C. After the addition was complete, the reaction mixture was stirred at room temperature overnight. The precipitated triethylammonium hydrochloride was filtered on a sintered glass funnel. The organic filtrate was washed repeatedly with water (3×500 ml), dried over anhydrous magnesium sulfate, filtered and concentrated in vacuo to afford 81 g. (80%) of product that was used as such.
Method B:

A 3-necked round bottomed flask was equipped with a mechanical stirrer, condenser, thermometer and a pressure equalizing addition funnel. The flask was charged with Adogen 464 (2.5 g), toluene (500 ml), de-ioned water (160 ml) and 50% aq. NaOH (165 g). The flask was cooled in an ice bath below 10° C. While stirring the contents rapidly, the hydroxyorthoester (150 g, 1.01 mol.) was added. Terephthaloyl chloride (121.8 g, 0.6 mol.) in toluene (2M solution) was added dropwise during 1 hr. keeping the temperature at 10° C. or lower. After the addition was complete, the reaction mixture was stirred for an additional 30 min. The layers were separated and 5 ml. of triethylamine were added to the organic layer which was then washed with water (3×500 ml), dried (MgSO$_4$), filtered and concentrated (rotary evaporator) without applying high heat (40° C.) and then placed under high vacuum to remove traces of toluene. The crude product was obtained in 86% yield and was used without further purification.
Synthesis of Butenyl Bisorthoester:

A 150 ml round bottomed flask was charged with 4-hydroxymethyl-2-methoxy-2-methyl-1,3-dioxolane (19.26 g, 130 mmol), 1,4-dibromo-2-butene (10.7 g, 50 mmol), toluene (40 ml), 30% aq. sodium hydroxide (35 g, 262 mmol) and benzyl triethylammonium hydrochloride (890 mg, 3.9 mmol). While kept under nitrogen, the whole mixture was vigorously stirred and heated in an oil bath at 60° C. for 8 hrs. then at room temperature overnight. The organic layer was diluted with dichloromethane (100 ml), triethyl amine (3 ml) and washed with water (2×100 ml), dried (MgSO$_4$) and concentrated in vacuo to afford 15.5 g (98% yield) of crude product which looked clean by $^1$H and $^{13}$C NMR. Vacuum distillation gave 8.9 g (56%) of pure product as a liquid, B.P. 170°–8° C./0.4 Torr.
Synthesis of Spiro-Bisorthoester:

Trimethyl orthoacetate (9.25 g, 77 mmol) was added under nitrogen to a mixture of pentaerythritol (5.0 g, 36.7 mmol) in benzene (55 ml) containing 15 mg of p-toluenesulfonic acid. The resulting mixture was stirred under nitrogen overnight. Unreacted insoluble pentaerythritol was filtered and the organic filtrate was neutralized by stirring with anhydrous sodium carbonate for 1 hr. Filtration and concentration in vacuo gave 2.22 g of white powder whose $^1$H NMR is consistent with the desired structure as a mixture of isomers.
Synthesis of Trisorthoester:

Following a similar procedure to that of Procedure A, the trisorthoester compound was prepared from 4-hydroxymethyl-2-methoxy-2-methyl-1,3-dioxolane (50.22 g, 339 mmol), and triethylamine (95 ml) in dichloromethane (315 ml) by acylation with 1,3,5-benzene tricarboxylic acid trichloride (30 g, 113 mmol) in dichloromethane (50 ml). After stirring at room temperature overnight, the reaction was worked up in a similar fashion and the desired product was obtained in 88% crude yield as a waxy solid and used without further purification.

The following examples and processing conditions are illustrative of the embodiments of the present invention. The compositions are typically extruded on a Welding Engineers 20 mm twin-screw extruder using a set temperature of about 250°–290° C. and about 10–30 inches Hg vacuum applied to the melt during compounding. The resultant compositions are generally molded using an Engel 30-ton injection molding machine using a temperature set of about 270°–295° C. and a mold temperature of about 70°–130° C. Molded test specimens of the compositions were subjected to measurement of notched Izod impact strength according to ASTM D256 (employing a sample size of 2.5 inch by 0.5 inch by 0.125 inch), and tensile yield and tensile elongation at break according to ASTM D638 using type I and type V test specimens. Delamination was determined by visual inspection.

The materials used in the following compositions were:
PPE is poly(2,6-dimethylphenylene ether) resin having an intrinsic viscosity of about 0.46 dl/gm measured in chloroform at 25° C., obtained from GE Plastics.

VVR-PPE is poly(2,6-dimethylphenylene ether) resin having an intrinsic viscosity of about 0.46 dl/gm as measured in chloroform at 25° C., obtained from GE Plastics, which has been extruded with vacuum venting followed by dissolving the extrudate in hot toluene and precipitation by treatment with methanol. The VVR-PPE was dried at about 110° C. prior to use.

PPE-FA is a nucleophile containing PPE prepared by extruding 2% by weight fumaric acid with PPE followed by dissolving the extrudate in hot toluene and precipitation by treatment with methanol. The PPE-FA was dried at about 110° C. prior to use.

BF-E is (polyethylene-co-12% glycidyl methacrylate) obtained under the trademark BONDFAST E from the Sumitomo Chemical Co., Ltd.

B-OE is the bisortho ester derived from 4-hydroxymethyl-2-methoxy-2-methyl-1,3-dioxolane and terephthaloyl chloride.

T-OE is the trisortho ester derived from 4-hydroxymethyl-2-methoxy-2-methyl-1,3-dioxolane and 1,3,5-benzene tricarboxylic acid trichloride.

EPDM is an ethylene-propylene-diene elastomer sold by Copolymer as trademark EPSYN as grade 801.

EP-OE is an EPDM functionalized with about 2% by weight of the acrylate orthoester derived from 4-hydroxymethyl-2-methoxy-2-methyl-1,3-dioxolane.

IM is a styrene-(ethylene-butylene)-styrene type impact modifier obtained from the Shell Chemical Co. under the trademark KRATON G1651.

PBT-1 is a poly(butylene terephthalate) resin having an I.V. of about 0.76 as measured in a 1:1 weight to weight mixture of phenol:1,1,2,2-tetrachloroethane at 30° C. and having an acid endgroup concentration of about 56 µeq/g and a Tg of about 40°–45° C. and a Tm of about 225° C.

PBT-2 is a poly(butylene terephthalate) resin having an I.V. of about 1.17 as measured in a 1:1 weight to weight mixture of phenol:1,1,2,2-tetrachloroethane at 30° C. and having an acid endgroup concentration of about 46 µeq/g and a Tg of about 40°–45° C. and a Tm of about 225° C.

PET is a poly(ethylene terephthalate) resin having an I.V. of about 0.72 as measured in a 1:1 weight to weight mixture of phenol:1,1,2,2-tetrachloroethane at 30° C. and having an acid endgroup concentration of about 20 µeq/g and a Tg of about 70°–75° C. and a Tm of about 265° C.

PEN is a poly(ethylene naphthalate) resin having an I.V. of about 0.75 as measured in a 1:1 weight to weight mixture of phenol:1,1,2,2-tetrachloroethane at 30° C. and having an acid endgroup concentration of about 11 µeq/g and a Tg of about 120°–129° C. and a Tm of about 265° C.

PBN is a poly(butylene naphthalate) resin having an I.V. of about 0.75 as measured in a 1:1 weight to weight mixture of phenol:1,1,2,2-tetrachloroethane at 30° C. and having an acid endgroup concentration of about 10 µeq/g and a Tg of about 80°–85° C. and a Tm of about 243° C.

ZSt. is zinc stearate obtained from Aldrich Chemical Co. and having a melting point of about 128°–130° C.

TABLE 1

| sample: | 1 | 2 | 3 | 4 | 5 | 6 |
|---|---|---|---|---|---|---|
| PPE | 32.4 | 0 | 0 | 0 | 0 | 0 |
| VVR-PPE | 0 | 32.4 | 0 | 0 | 0 | 0 |
| PPE-FA | 0 | 0 | 32.4 | 32.4 | 32.4 | 32.4 |
| BF-E | 7.5 | 7.5 | 0 | 7.5 | 7.5 | 12.5 |
| IM | 5 | 5 | 12.5 | 5 | 5 | 0 |
| PET | 54.9 | 54.9 | 54.9 | 54.9 | 54.9 | 54.9 |
| ZSt. | 0.2 | 0.2 | 0.2 | 0 | 0.2 | 0.2 |
| notched Izod; ft-lb/in | 0.2 | 0.2 | 0.7 | 1.5 | 2.0 | 1.4 |
| unnotched Izod; ft-lb in | 5.5 | 4.9 | NB | NB | NB | NB |
| tensile strength; psi | 4001 | 4128 | 6388 | 6958 | 6781 | 6428 |
| ultimate elongation; % | 4 B | 4 B | 14 D | 18 D | 26 D | 26 D |

D is ductile; B is brittle.

As seen by the data in the table, sample 1 is a control blend typical of the prior art containing a non-functionalized PPE with an epoxy-functional polyolefin and a polyester resin. This sample upon injection molding into test parts had very poor physical properties as noted by the very low impact and tensile properties. Sample 2, utilizing vacuum vented PPE (VVR-PPE), had very similar poor physical properties. Sample 3 comprises the nucleophile containing PPE (PPE-FA but does not contain the compatibilizer compound (BF-E). The results of these blends are typical for PPE-polyester blends that are poorly compatibilized.

When a similar composition is prepared, sample 4, containing PPE-FA, a nucleophile containing PPE, in addition to the compatibilizer compound and polyester resin, considerably improved impact and tensile properties were achieved. This result is consistent with a theory that the nucleophile containing PPE undergoes a reaction with the compatibilizer compound and polyester in some fashion to make a PPE-copolymer.

As shown in sample 5, the addition of a small amount of zinc stearate to sample 4 results in an improvement in the impact strength and ductility of the composition. As illustrated in sample 6, compositions that do not contain the styrenic based impact modifier still retain good physical properties, although at a reduced level of ductility.

TABLE 2

| sample: | 7 | 8 | 9 | 10 | 11 |
|---|---|---|---|---|---|
| VVR-PPE | 32.4 | 0 | 0 | 0 | 0 |
| PPE-FA | 0 | 32.4 | 32.4 | 32.4 | 32.4 |
| BF-E | 7.5 | 0 | 0 | 7.5 | 7.5 |
| IM | 0 | 12.5 | 12.5 | 5 | 5 |
| PBT-1 | 0 | 0 | 54.9 | 0 | 54.9 |
| PBT-2 | 54.9 | 54.9 | 0 | 54.9 | 0 |
| ZSt. | 0.2 | 0 | 0 | 0.2 | 0.2 |
| notched Izod; ft-lb/in | 0.3 | 0.3 | 0.2 | 1.7 | 1.9 |
| unnotched Izod; ft-lb/in | 6.5 | 11 | 2.8 | NB | NB |
| tensile strength; psi | 5824 | 6388 | 4980 | 6359 | 5722 |
| ultimate elongation; % | 11 B | 14 B | 7 B | 54 D | 55 D |

D is ductile; B is brittle.

The data in Table 2 are illustrative of compositions comprising PPE and poly(butylene terephthalate) resins. Samples 7, 8 and 9 are control compositions demonstrating the poor impact and tensile properties obtained when either the nucleophilic PPE is absent (sample 7) or the compatibilizer compound is absent (samples 8 and 9). Samples 9 and 10 demonstrate part of the present invention and utilize two different molecular weight poly(butylene terephthalate) resins that also have different endgroup concentrations. As seen by the data, good impact and tensile properties are obtained utilizing a nucleophile containing PPE in combination with a compatibilizer compound and poly(butylene terephthalate) resins.

TABLE 3

| sample: | 12 | 13 | 14 | 15 |
|---|---|---|---|---|
| PPE-FA | 32.4 | 32.4 | 32.4 | 32.4 |
| BF-E | 12.5 | 7.5 | 12.5 | 7.5 |
| IM | 0 | 5 | 0 | 5 |
| PBN | 54.9 | 54.9 | 0 | 0 |
| PEN | 0 | 0 | 54.9 | 54.9 |
| ZSt. | 0.2 | 0.2 | 0.2 | 0.2 |
| notched Izod; ft-lb/in | 3.2 | 2.5 | 4.5 | 1.9 |
| unnotched Izod; ft-lb/in | NB | NB | NB | NB |
| tensile strength; psi | 6253 | 6435 | 6873 | 6397 |
| ultimate elongation; % | 35 D | 29 D | 113 D | 71 D |

D is ductile; B is brittle.

The data in Table 3 illustrate that a wide variety of polyester resins can be utilized in the present invention. For example, samples 12 through 15 demonstrate compositions with good impact strength, ductility and tensile properties for compositions comprising poly(butylene naphthalate) and poly(ethylene naphthalate) resins with a nucleophile containing PPE and a compatibilizer compound.

TABLE 4

| sample: | 16 | 17 | 18 | 19 |
|---|---|---|---|---|
| PPE-FA | 30 | 30 | 30 | 30 |
| PBT-1 | 0 | 0 | 0 | 60 |
| PBT-2 | 60 | 60 | 60 | 0 |
| B-OE | 0 | 2 | 4 | 4 |
| IM | 10 | 10 | 10 | 10 |
| notched Izod; ft-lb/in | 0.1 | 0.5 | 0.2 | 0.2 |
| unnotched Izod; ft-lb/in | 2.4 | 6.3 | 4.4 | 3.4 |
| tensile strength; psi | 4563 | 6068 | 5599 | 5045 |
| ultimate elongation; % | 7 | 13 | 9 | 9 |

The data in Table 4 illustrate the improvement in compatibilization between a nucleophile containing PPE and a polyester with a bis-orthoester compatibilizing compound. For example, samples 17 through 19 demonstrate compositions with good tensile properties for compositions comprising the bis-orthoester compound when compared to a control, sample 16, that does not contain the bis-orthoester compound.

TABLE 5

| sample: | 20 | 21 | 22 | 23 |
|---|---|---|---|---|
| PPE | 0 | 0 | 0 | 32.5 |
| PPE-FA | 32.5 | 32.5 | 32.5 | 0 |
| PBT2 | 55 | 55 | 55 | 55 |
| EPDM | 12.5 | 0 | 0 | 0 |
| EP-OE | 0 | 12.5 | 7.5 | 12.5 |
| IM | 0 | 0 | 5 | 0 |
| notched Izod; ft-lb/in | 0.1 | 0.25 | 0.2 | 0.2 |
| unnotched Izod; ft-lb/in | 1.7 | 2.8 | 2.4 | 2.3 |
| tensile strength; psi | 4133 | 4469 | 4622 | 4172 |
| ultimate elongation; % | 6 | 7 | 6 | 7 |

The data in Table 5 illustrate the improvement in compatibilization between a functionalized PPE and a polyester in using an elastomer containing a orthoester compound. For example, samples 21 and 22 demonstrate compositions with good tensile properties for compositions comprising an elastomer containing a orthoester compound when compared to a control, sample 20, that does not contain an elastomer containing a orthoester compound or a control, sample 23, that does not contain a nucleophile containing PPE.

TABLE 6

| sample: | 24 | 25 | 26 | 27 | 28 | 29 | 30 |
|---|---|---|---|---|---|---|---|
| PBT2 | 100 | 99.8 | 99.24 | 98.3 | 97.6 | 99.5 | 99 |
| B-OE | 0 | 0.2 | 0.76 | 1.7 | 2.4 | 0 | 0 |
| T-OE | 0 | 0 | 0 | 0 | 0 | 0.5 | 1.0 |
| melt flow (sec$^{-1}$)* | 6.8 | 7.2 | 8.1 | 10.7 | 8.1 | 10.2 | 14.0 |
| Mw | 69,700 | 95,200 | 103,500 | 107,300 | 91,000 | 98,170 | 106,544 |
| Mn | 29,600 | 49,200 | 53,000 | 57,000 | 38,600 | 51,270 | 53,271 |

*Melt flow was determined at 250° C. Mw and Mn are relative to polystyrene standards.

The data in Table 6 illustrates that the compatibilizer compounds, for example, ortho ester compounds, can be used to chain extend or couple polymers. Sample 24 is a control containing a polyester resin without a compatibilizing compound. Samples 25 to 30 contain various amounts of bis- or tris-ortho ester compounds and illustrate the increase in the molecular weight and viscosity of the polyester resin with the addition of the compatibilizing agent. These data are consistent with the hypothesis of reactions occurring between the nucleophile containing poly(phenylene ether) resin and polyester resin with the compatibilizer compound. As evident from these data, the order of addition of the nucleophile containing poly(phenylene ether) resin, polyester resin, and compatibilizer compound can lead to a variety of coupled polymers. For example, a sequence of addition wherein the polyester is added at a time after the nucleophile containing poly(phenylene ether) resin and compatibilizing compound have been melt compounded and with certain ratios of nucleophile containing poly(phenylene ether) resin and compatibilizer compound, a poly(phenylene ether) resin coupled material is obtained at the expense of reaction between the nucleophile containing poly(phenylene ether) resin and the polyester and coupling of the polyester resin to additional polyester resin. Similarly, with a different addition sequence and certain ratios of the polyester to compatibilizing compound, appreciable amounts of coupled polyester can be obtained.

TABLE 7

| sample: | 31 | 32 | 33 | 34 | 35 |
|---|---|---|---|---|---|
| PPE-FA | 100 | 98.5 | 0 | 0 | 0 |
| PA | 0 | 0 | 100 | 99 | 98 |
| B-OE | 0 | 1.5 | 0 | 1 | 2 |
| melt flow (sec$^{-1}$)* | 12.4 | 28.3 | 5.3 | 16.6 | 17.1 |
| Mw | — | — | 49,050 | 64,000 | 69,800 |
| Mn | — | — | 18,800 | 19,800 | 20,800 |

*Melt flow was determined at 250° C. Mw and Mn are relative to polystyrene standards.

Table 7 contains data further illustrating the use of the compatibilizing reactions to affect reactions between polymers containing species capable of reacting with the compatibilizing agent. In Table 7, the data illustrates that functionalized PPE, for example PPE-FA, or polyamides, such as, for example, nylon-6 and nylon-6,6, can be coupled with a compatibilizing agent to build viscosity an molecular weight. As seen by comparing the data for control Sample 31 containing PPE-FA to Sample 32 containing PPE-FA and 1.5 weight percent bis-orthoester, the PPE was coupled as indicated by the large increase in the melt flow (e.g., larger number is indicative of increased viscosity which is indicative of increased molecular weight). Also, as seen by comparison of Sample 33 to Sample 34, addition of 1 weight % of a bis-orthoester has more than tripled the melt flow and increased the weight average molecular weight by about 30%.

It should be clear from the illustrative data contained in the Examples that the compatibilizing compounds can be used to chain extend or couple many polymers provided that the polymers contain moieties capable of reacting with the compatibilizing agent. Illustrative examples of polymers capable of chain extension or coupling include, for example, nucleophile containing poly(phenylene ether) resins, polyester resins, poly(arylene sulfide) resins, polyamide resins, nucleophile containing polycarbonate resins, polyetherimide resins, nucleophile containing polyolefins, nucleophile containing polysulfones and polyether sulfones, and the like. It should also be clear that homopolymer coupled resins represent an additional embodiment of the present invention. The compatibilizing agent is generally added in an effective amount to increase the molecular weight of the resin to be coupled. It should also be apparent that concentrates of compatibilizing agent in a resin can also be utilized for either homopolymer coupling or for compatibilizing a nucleophile containing poly(phenylene ether) resin with polyester resins.

What is claimed:

1. A novel resin composition comprising:

a copolymer of poly(phenylene ether) resin and polyester resin made by a process comprising the steps of:
   (i) melt mixing a composition comprising a poly (phenylene ether) resin and a compound having both:
      (a) a carbon-carbon double bond or a carbon-carbon triple bond; and
      (b) at least one species selected from the group consisting of carboxylic acids, acid anhydrides, acid amides, imides, amines, hydroxyls, and carboxylic acid ammonium salts to produce a nucleophile containing poly(phenylene ether) resin; and
   (ii) melt mixing said nucleophile containing poly (phenylene ether) resin with a polyester resin and a compatibilizer compound for said nucleophile containing poly(phenylene ether) resin and said polyester resin; and wherein said compatibilizer compound comprises at least two electrophilic moieties per compatibilizer compound and wherein said electrophilic moieties are selected from the group consisting of epoxy, orthoester, and mixtures of epoxy and orthoester;

wherein the polyester resin comprises a liquid crystalline polyester and a second polyester resin selected from the group consisting of poly(butylene terephthalate), poly (ethylene terephthalate), poly(cyclohexylenedimethanol terephthalate), poly(butylene naphthalate), poly(ethylene naphthalate), and mixtures containing at least one of the foregoing.

2. The composition of claim 1, wherein the compound of step (i) is selected from the group consisting of maleic anhydride, fumaric acid, maleimides, maleic hydrazide, methylnadic anhydride, fatty oils, unsaturated carboxylic acids, unsaturated alcohols, and unsaturated amines.

3. The composition of claim 2, wherein the compatibilizer compound is a copolymer of an α-olefin with a glycidyl ester of an α,β-unsaturated carboxylic acid.

4. The composition of claim 1, wherein the compatibilizer compound is present in an amount sufficient to improve the compatibility between the nucleophile containing poly (phenylene ether) resin and the polyester resin.

5. A composition according to claim 4, wherein the compatibilizer compound is present in an amount sufficient to afford a composition having no visual sign of lamination.

6. The composition according to claim 5, further having an ultimate tensile elongation value in excess of 8% and a notched Izod impact strength in excess of 1 foot-pound/inch.

7. The composition of claim 1, further comprising at least one non-nucleophile containing poly(phenylene ether) resin, at least one non-epoxy functional polyolefin, or both.

8. The composition of claim 1, further comprising at least one additive selected from the group consisting of impact modifiers, reinforcing fillers, non-elastomeric metal salts, flow promoters, flame retardants, drip retardants, dyes, pigments, colorants, stabilizers, antistatic agents, crystallization nucleators, plasticizers, non-reinforcing fillers and lubricants.

9. An article made from the composition of claim 1.

10. A method to prepare a resin composition comprising the steps of:
   (i) melt mixing a composition comprising a poly (phenylene ether) resin and a compound having both:
      (a) a carbon-carbon double bond or a carbon-carbon triple bond; and
      (b) at least one species selected from the group consisting of carboxylic acids, acid anhydrides, acid amides, imides, amines, hydroxyls, and carboxylic acid ammonium salts to produce a nucleophile containing poly(phenylene ether) resin; and
   (ii) melt mixing said nucleophile containing poly (phenylene ether) resin with a polyester resin and a compatibilizer compound for said nucleophile containing poly(phenylene ether) resin and said polyester resin;

wherein said compatibilizer compound comprises at least two electrophilic moieties per compatibilizer compound and wherein said electrophilic moieties are selected from the group consisting of epoxy, orthoester, and mixtures of epoxy and orthoester;

wherein the polyester resin comprises a liquid crystalline polyester and a second polyester resin selected from the group consisting of poly(butylene terephthalate), poly (ethylene terephthalate), poly(cyclohexylenedimethanol terephthalate), poly(butylene naphthalate), poly(ethylene naphthalate), and mixtures containing at least one of the foregoing.

11. A composition consisting essentially of a poly (phenylene ether) resin, a polyester resin, and a copolymer of a poly(phenylene ether) resin and a polyester resin made by a process comprising the steps of:
   (i) melt mixing a composition comprising a poly (phenylene ether) resin and a compound having both:
      (a) a carbon-carbon double bond or a carbon-carbon triple bond; and
      (b) at least one species selected from the group consisting of carboxylic acids, acid anhydrides, acid amides, imides, amines, hydroxyls, and carboxylic acid ammonium salts to produce a nucleophile containing poly(phenylene ether) resin; and
   (ii) melt mixing said nucleophile containing poly (phenylene ether) resin with a polyester resin and a compatibilizer compound for said nucleophile containing poly(phenylene ether) resin and said polyester resin; and wherein said compatibilizer compound comprises at least two electrophilic moieties per compatibilizer compound and wherein said electrophilic moieties are selected from the group consisting of epoxy, orthoester, and mixtures of epoxy and orthoester;

wherein the polyester resin comprises a liquid crystalline polyester and a second polyester resin selected from the group consisting of poly(butylene terephthalate), poly (ethylene terephthalate), poly(cyclohexylenedimethanol terephthalate), poly(butylene naphthalate), poly(ethylene naphthalate), and mixtures containing at least one of the foregoing; optionally, an impact modifier that is not a compatibilizer compound for said nucleophile containing poly(phenylene ether) resin and said polyester resin; and optionally, a non-elastomeric metal salt.

* * * * *